United States Patent
Vishwanath et al.

(10) Patent No.: US 12,518,501 B2
(45) Date of Patent: Jan. 6, 2026

(54) IDENTIFYING CONTIGUOUS REGIONS OF CONSTANT PIXEL INTENSITY IN IMAGES

(71) Applicant: Microsoft Technology Licensing, LLC, Redmond, WA (US)

(72) Inventors: Vidush Vishwanath, Santa Clara, CA (US); Changbo Hu, Fremont, CA (US); Rajesh Koduru, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 487 days.

(21) Appl. No.: 18/120,334

(22) Filed: Mar. 10, 2023

(65) Prior Publication Data
US 2024/0303953 A1 Sep. 12, 2024

(51) Int. Cl.
*G06V 10/22* (2022.01)
*G06T 7/13* (2017.01)
*G06V 10/60* (2022.01)

(52) U.S. Cl.
CPC .............. *G06V 10/23* (2022.01); *G06T 7/13* (2017.01); *G06V 10/60* (2022.01); *G06T 2207/20212* (2013.01)

(58) Field of Classification Search
CPC .......... G06V 10/23; G06V 10/60; G06T 7/13; G06T 7/11; G06T 7/136; G06T 7/187;
(Continued)

(56) References Cited

U.S. PATENT DOCUMENTS 8,229,230 B2   7/2012  Hayber
8,731,334 B2 * 5/2014  Lefebvre .............. G06V 10/955
                                                   382/172
(Continued)

FOREIGN PATENT DOCUMENTS

CN    113963295 A    1/2022
CN    115205171 A   10/2022
(Continued)

OTHER PUBLICATIONS

PCT Search Report and Written Opinion for PCT/US2024/018445, mailing date Jul. 5, 2024, 16 pages.
(Continued)

*Primary Examiner* — John B Strege

(57) ABSTRACT

A technique identifies regions of an image characterized by constant pixel intensity in a resource-efficient, latency-efficient, and scalable manner. The technique involves: obtaining a candidate image; determining whether the candidate image contains a contiguous region of pixels having intensity values within a specified range of intensity values; assessing whether the contiguous region satisfies a prescribed test; and selecting or excluding the candidate image for further processing based on a result of the assessing. The operation of determining involve two phases. First, the technique determines a distribution of intensity values within the candidate image. Second, the technique leverages the distribution to search the candidate image for neighboring pixels having intensity values within the specified range of intensity values, beginning from a selected starting pixel in a qualifying subset of pixels. In some examples, the technique is applied to the task of combining supplemental content with the candidate image.

18 Claims, 9 Drawing Sheets

(58) Field of Classification Search
CPC ........... G06T 7/194; G06T 2207/20212; G06T 2207/10004; G06T 2207/20081; G06T 2207/20084
See application file for complete search history.

(56) References Cited

U.S. PATENT DOCUMENTS

| | | | |
|---|---|---|---|
| 10,824,878 | B2 | 11/2020 | Houri et al. |
| 11,461,415 | B2 | 10/2022 | Lu et al. |
| 2004/0213446 | A1* | 10/2004 | Shams .................. G06T 5/50 382/129 |
| 2006/0050788 | A1 | 3/2006 | Techmer |
| 2012/0002083 | A1* | 1/2012 | Machida .................. G06T 5/40 348/E5.054 |
| 2012/0177262 | A1 | 7/2012 | Bhuiyan |
| 2015/0074027 | A1 | 3/2015 | Huang et al. |
| 2015/0278200 | A1 | 10/2015 | He et al. |
| 2016/0269714 | A1 | 9/2016 | Rhemann et al. |
| 2016/0378180 | A1* | 12/2016 | Theytaz ............. G02B 26/0833 345/8 |
| 2017/0238842 | A1* | 8/2017 | Jacquel .................. A61B 5/746 |
| 2020/0294763 | A1* | 9/2020 | Chang .................... H01J 37/26 |
| 2021/0374436 | A1* | 12/2021 | Han ...................... G06V 20/588 |
| 2022/0083775 | A1* | 3/2022 | Chu ........................ G06V 10/22 |

FOREIGN PATENT DOCUMENTS

| | | |
|---|---|---|
| EP | 3422286 A1 | 1/2019 |
| EP | 1856710 B1 | 6/2019 |
| KR | 102103280 B1 | 6/2020 |

OTHER PUBLICATIONS

Espacenet Patent Search abstract for CN113963295A, available at https://worldwide.espacenet.com/patent/search/family/079466399/publication/CN113963295A?q=pn%3DCN113963295A, accessed on Feb. 19, 2023, 1 page.

Google Patents translation of CN113963295(A), available at https://patents.google.com/patent/CN113963295A/en? bq-CN113963295A, accessed on Feb. 19, 2023, 11 pages.

Espacenet Patent Search abstract for CN115205171A, available at https://worldwide.espacenet.com/patent/search/family/083575052/publication/CN115205171A?q=pn%3DCN115205171A, accessed on Feb. 19, 2023, 1 page.

Google Patents translation of CN115205171A, available at https://patents.google.com/patent/CN115205171A/en? bq=cn+115205171, accessed on Feb. 19, 2023, 20 pages.

Espacenet Patent Search abstract for KR102103280B1, available at https://worldwide.espacenet.com/patent/search/family/071083196/publication/KR102103280B1?q=pn%3DKR102103280B1, accessed on Feb. 19, 2023, 1 pages.

Google Patents translation of KR102103280B1, available at https://patents.google.com/patent/KR102103280B1/en? bq=kr+102103280, accessed on Feb. 19, 2023, 8 pages.

Yamazaki, et al., "Detection of Moving Objects by Independent Component Analysis," in Narayanan, et al. (Eds.), Computer Vision, ACCV 2006, Lecture Notes in Computer Science, vol. 3852, Springer, Berlin, Heidelberg, 2006, pp. 467-478.

* cited by examiner

ILLUSTRATIVE
PROCESS,
PART II
302 →

SORT PIXELS IN THE
CURRENT WINDOW BY X,
AND THEN Y, COORDINATES,
TO PROVIDE A SORTED SET
304

↓

CHOOSE A FIRST
QUALIFYING PIXEL SUBSET
WITHIN IN THE SORTED SET
306

↓

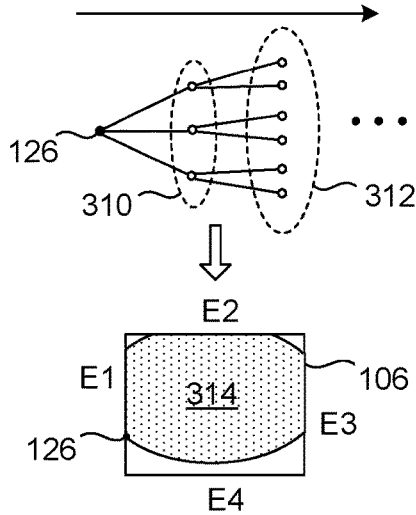

EXAMPLE OF BLOCK 308

PERFORM SEARCH FOR NEIGHBORING PIXELS WITHIN THE CANDIDATE IMAGE
HAVING PIXEL INTENSITY VALUES WITHIN A SPECIFIED RANGE, STARTING FROM
A SELECTED STARTING PIXEL WITHIN THE QUALIFYING PIXEL SUBSET, TO
PROVIDE A CANDIDATE REGION
308

↓

DOES CANDIDATE REGION
SATISFY A PRESCRIBED SIZE AND
EDGE-INTERSECTION TEST?
316

— Y → QUALIFYING REGION FOUND, OPTIONALLY RETURN TO PART I
318

↓ N

ANY MORE SUBSETS OF PIXELS
TO PROCESS?
320

— N → RESULT = FALSE, RETURN TO PART I
324

↓ Y

PIXEL SUBSET = NEXT
QUALIFYING PIXEL SUBSET IN
THE SORTED SET
322

FIG. 3

IDENTIFYING CONTIGUOUS REGIONS OF CONSTANT PIXEL INTENSITY IN IMAGES

BACKGROUND

Many techniques for processing images offer high accuracy. Yet some of these techniques cannot be applied in all application environments. For instance, some techniques are too resource-intensive in nature for use in some application environments. In addition, or alternatively, some techniques may be too complex to satisfy the latency constraints of some application environments.

Consider, for instance, techniques for segmenting background content from foreground content in images. Some techniques require the processing of plural successive frames in a video sequence to identify background content in the frames. Other techniques require the use of complex machine-learning models to identify background content. Some of these techniques may be unsuitable for use in those environments that require real-time performance and/or environments using resource-constrained processing platforms.

SUMMARY

A technique is described herein for identifying contiguous regions of an image characterized by constant pixel intensity in a resource-efficient and latency-efficient manner. As used herein, the term "constant intensity" refers to a region having pixels values within a specified range of intensity values. The "intensity value" of a pixel, in turn, generally refers to an amount of light that the pixel will emit when presented on a display device. In many cases, the intensity value of a pixel refers to its grayscale value within the specified range of intensity values. A "contiguous region" is a region in which each pixel within the specified range has at least one directly-neighboring pixel within the specified range.

In illustrative examples, the technique involves: obtaining a candidate image; determining whether the candidate image contains a contiguous region of pixels having intensity pixel values within the specified range of pixel intensity values; assessing whether the contiguous region satisfies a prescribed test; and selecting or excluding the candidate image for further processing based on a result of the assessing.

In illustrative examples, the operation of determining involves two phases. In a first phase, the technique determines a distribution of pixel intensity values within the candidate image, e.g., as expressed in a histogram. In a second phase, the technique leverages the distribution to search the candidate image for neighboring pixels having pixel intensity values within the specified range of pixel intensity values, starting from a selected starting pixel. In some examples, the technique performs its search using a breadth-first search.

In some examples, the above-referenced test involves determining whether a quantity of pixels in the contiguous region satisfies another threshold value, with respect to a total quantity of pixels in the candidate region. In some examples, the test also involves determining whether the contiguous region intersects with edge portions of the candidate image by a prescribed amount.

In some examples, the above-referenced further processing involves combining the candidate image with other image content. For instance, the candidate image provides background content, and the other image content provides supplemental content (such as ad-related content) that is displayed next to the candidate image, over the candidate image, etc.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 shows a process that performs a second part of the region-identifying process used by the image-processing system of FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Figure 1:
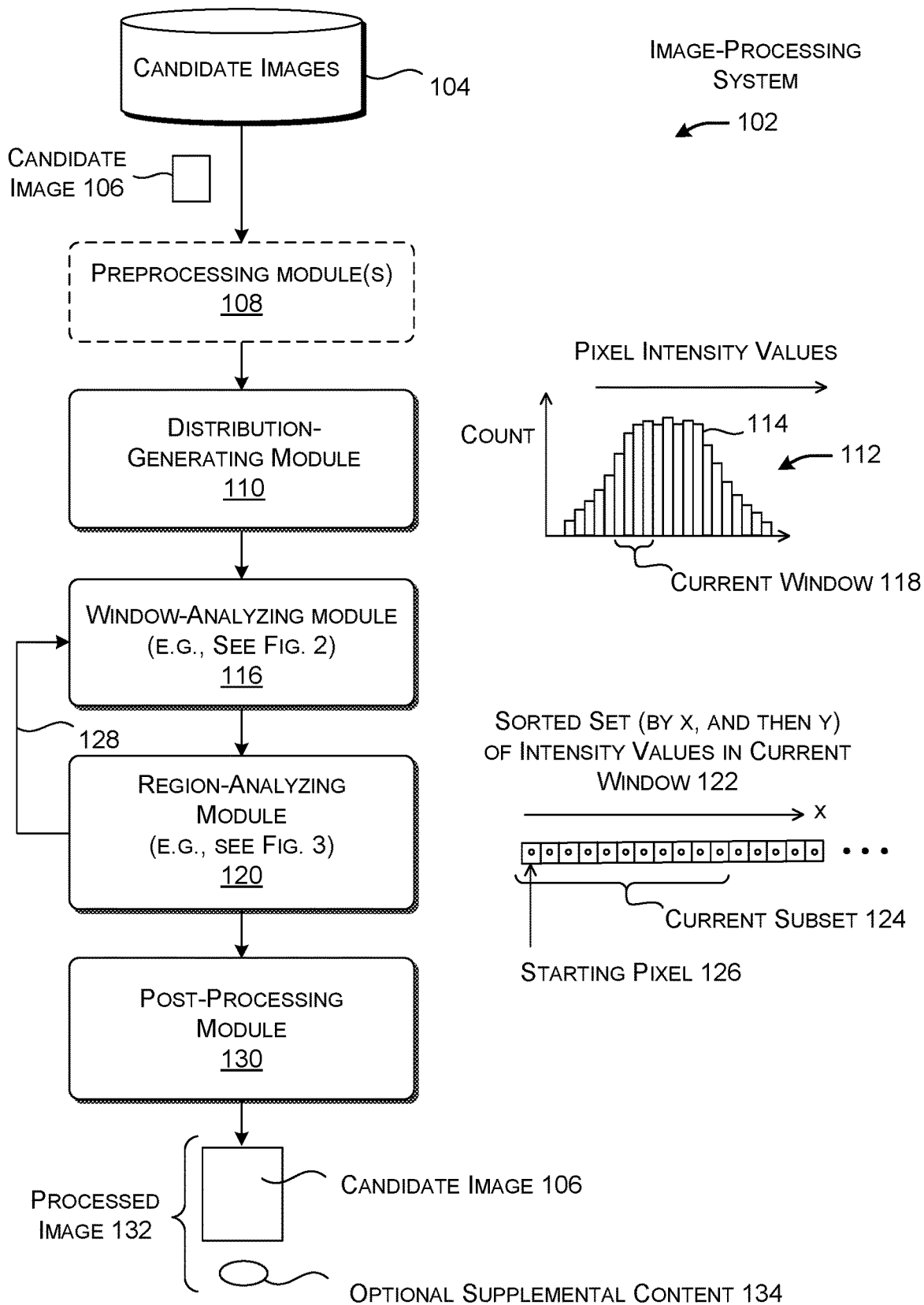
FIG. 1 shows an illustrative image-processing system for identifying contiguous regions of constant intensity in images.

FIG. 1 shows one implementation of an image-processing system 102 for detecting contiguous regions of constant pixel intensity in an image. As used herein, "constant intensity" is shorthand reference to pixel intensity within a prescribed application-specific range of intensity values. Although the intensities of pixels may vary within this range, the range is considered small enough that the pixel intensities can be effectively consider the same. The "intensity" of a pixel refers to the amount of light it produces when presented on a display device. In some implementations, the pixel of a grayscale image refers to its numerical value in a range of numerical values, such as the range of 0 to 255. Intensities of the pixels in a color image refer to intensities in the color image's counterpart grayscale image. For example, in the RGB color scheme, the intensity of a color pixel is expressible as a linear function of its red (R), green (G), and blue (B) components, e.g., grayscale value=0.3*R+0.59*G+0.11*B. A human observer will generally perceive regions of higher intensity in an image as brighter than regions of lower intensity. The phrase "pixel intensity" is often abbreviated below to "intensity," to facilitate explanation. A region of "contiguous" constant pixel values is a region in which each pixel within the prescribed intensity range is an immediate neighbor of at least one other pixel within the prescribed intensity range. Two pixels that are direct neighbors of each other are considered spatially connected.

In some implementations, the image-processing system 102 performs processing on a collection of candidate images in a data store 104. In some implementations, the image-processing operation performs any type of further processing on a candidate image when it is determined to either include a qualifying contiguous region, or is determined to exclude a qualifying contiguous region. A qualifying contiguous region is a region that meets a set of tests described below.

In one application environment, for instance, the image-processing system 102 serves the candidate image to a user upon discovering it is free of a qualifying contiguous region, e.g., by serving the image by itself or optionally accompanied by supplemental content. For example, the candidate image and the supplemental content together constitute an advertisement that is served to the user. In other cases, the image-processing system 102 serves the candidate image to a user upon discovering that it includes at least one qualifying region. In yet other cases, the image-processing system 102 performs any other operations upon discovering a qualifying contiguous region, including any of: reducing the resolution of the identified region, cropping the region, blurring the region, replacing the region with other image content, classifying the region, etc., or any combination thereof.

According to illustrative merits, the image-processing system 102 processes plural images with reduced latency and/or reduced consumption of resources, compared to more complex image-processing systems. For example, in some implementations, the image-processing system 102 avoids or reduces the use of machine-trained components, such as neural networks. This confers several advantages. First, the image-processing system 102 consumes fewer resources compared to a system that makes heavy use of machine-trained components, such as GPU-intensive machine-trained components. Second, the design of the image-processing system 102 avoids or reduces the time-intensive and resource-intensive task of designing and training machine-trained components. Third, the image-processing system 102 offers superior latency-related performance relative to systems that make use of machine-trained components. Fourth, the image-processing system 102 performs its tasks in a manner that is agnostic to the specific objects that an image may contain; this characteristic, combined with the image-processing system's efficient use of resources and low latency, makes it more flexible and scalable than some machine-trained solutions. More specifically, a training system develops machine-trained components based on a corpus of images; the machine-trained components may exhibit poor performance when they are subsequently fed images that do not share the same characteristics as the corpus of images used in training. With the above said, however, the image-processing system 102 need not entirely omit machine-processing; that is, some implementations may incorporate machine-learning functionality to perform some aspects of their processing.

Further, in some implementations, the image-processing system 102 evaluates the appropriateness of a candidate image based on the candidate image itself, without requiring analysis of plural candidate images in a stream of candidate images. This characteristic achieves the same kind of resource-related and latency-related efficiencies described above.

The illustrative components of the image-processing system 102 will now be described in a generally top-to-bottom manner. The processing performed by FIG. 1 will be specifically described in the context of operations performed on a single candidate image 106 selected from the candidate images in the data store 104. The image-processing system 102 performs the same processing on other candidate images in the data store 104, e.g., in series or in parallel, or by employing a combination of serial and parallel operations.

A preprocessing module 108 performs any kind of application-specific preprocessing operations on the candidate image 106. For example, in some applications, the preprocessing module 108 performs preliminary analysis on the candidate image 106 to determine whether it contains objectionable content, such as adult content or copyrighted content, and whether the candidate image 106 is semantically incompatible with an identified instance of supplemental content. If any of these issues are identified, the preprocessing module 108 excludes the candidate image 106, and the image-processing system 102 performs no further processing on the candidate image 106. In other implementations, the image-processing system 102 omits use of the preprocessing module 108 altogether. Additional information regarding one implementation of the preprocessing module 108 is set forth below in the context of the explanation of FIG. 5. In other implementations, the operations of the preprocessing module 108 occur at a later stage in the processing flow shown in FIG. 1.

A distribution-generating module 110 generates a distribution 112 of pixel intensity values within the candidate image 106 (assuming the candidate image 104 passes whatever test(s) are applied by the preprocessing module 108). In some implementations, the distribution 112 is specifically expressed as a histogram. The histogram includes successive buckets of intensity values along a first (e.g., horizontal) axis and pixel counts along a second (e.g., vertical) axis. A "bucket" is a subrange of intensity values. Bucket 114 is one such illustrative bucket. For instance, a first bucket describes the number of pixels with intensity values between 0 and $value_1$, a next bucket describes a number of pixels with intensity values between $value_1$ and $value_2$, etc. The size of a bucket is the length of the span between its lower and upper bounds (e.g., between $value_1$ and $value_2$). Different implementations of the image-processing system 102 can choose different environment-specific bucket sizes.

A window-analyzing module 116 performs preliminary analysis on a plurality of windows within the distribution 112. A window is a range of intensity values that may include one or more buckets, such as four buckets. Window 118 is one such illustrative window. More specifically, the window-analyzing module 116 determines whether a current window under consideration includes a threshold quantity of pixels. For example, the window-analyzing module 116 determines whether the total number of pixels in the window divided by the total number of pixels in the candidate image 106 satisfies an environment-specific threshold value. Additional information regarding one implementation of the processing performed by the window-analyzing module 116 appears in the context of the explanation of FIG. 2, to follow.

A region-analyzing module 120 performs additional processing with respect to a window that passes the test applied by the window-analyzing module 116. In some implementations, the region-analyzing module 120 specifically sorts the pixels in the candidate image 106 by their position in the candidate image 106, e.g., by sorting the pixels by their position along the x axis of the candidate image 106, and then sorting all pixels that share the same x value by their y value along they axis. This defines a sorted set 122 of pixels.

The region-analyzing module 120 then chooses a qualifying subset of pixels 124 (based on a test described below), and chooses a starting pixel 126 within the qualifying subset 124 of pixels. The region-analyzing module 120 then performs a search within the candidate image 106 to find all neighboring pixels with intensity values within the range of the current window 118, beginning with the starting pixel 126. For example, using a breadth-first search, the region-analyzing module 120 determines all pixels having intensity values within the span of the current window that are direct neighbors to the starting pixel 126. This defines a first group of neighboring pixels. The region-analyzing module 120 then finds all pixels that are direct neighbors to any of the first group of pixels. This defines a second group of neighboring pixels. This process is repeated until no further neighboring pixel is defined. The complete set of neighboring pixels defines a candidate contiguous region. Next, the region-analyzing module 120 determines whether the candidate contiguous region satisfies a prescribed environment-specific test. The region-analyzing model 120 can apply the same process to other qualifying subsets of pixels within the sorted set 122 of pixels. Additional information regarding one implementation of the processing performed by the region-analyzing module 120 appears in the context of the explanation of FIGS. 3 and 4, to follow.

The processing performed by the window-analyzing module 116 and the region-analyzing module 120 represent two parts of processing performed by the image-processing system 102. The arrow 128 in FIG. 1 indicates that, in some implementations, the image-processing system 102 repeats the two parts one or more times. For example, upon the failure to identify a suitable contiguous region with respect to the current window 118, the image-processing system 102 invokes the window-analyzing module 116 to identify a next qualifying window. The region-analyzing module 120 then performs the above-described operations for the new window. Other implementations can use other processing flows to execute these operations, such as by identifying all the qualifying windows in the first phase, and then, in the second phase, analyzing all the qualifying windows in parallel.

In some implementations, the window-analyzing module 116 and the region-analyzing module 120 yield two output results. A first result is a binary indication of whether the candidate image 106 contains a qualifying contiguous region, where a qualifying contiguous region is a region that satisfies the tests of the window-analyzing module 116 and the region-analyzing module 120. A second result identifies the pixels of the qualifying contiguous region.

A post-processing module 130 performs additional processing on the candidate image 106 based a conclusion drawn by the region-analyzing module 120. For example, assume that the candidate image 106 is determined to be free of any qualifying contiguous region of constant intensity values. If so, the post-processing module 130 produces a processed image 132 which combines the candidate image 106 with supplemental content 134. For instance, the post-processing module 130 may present the supplemental content 134 next to the candidate image 106, and/or over the candidate image 106, and/or merged (e.g., blended) with the candidate image 106.

Figure 2:
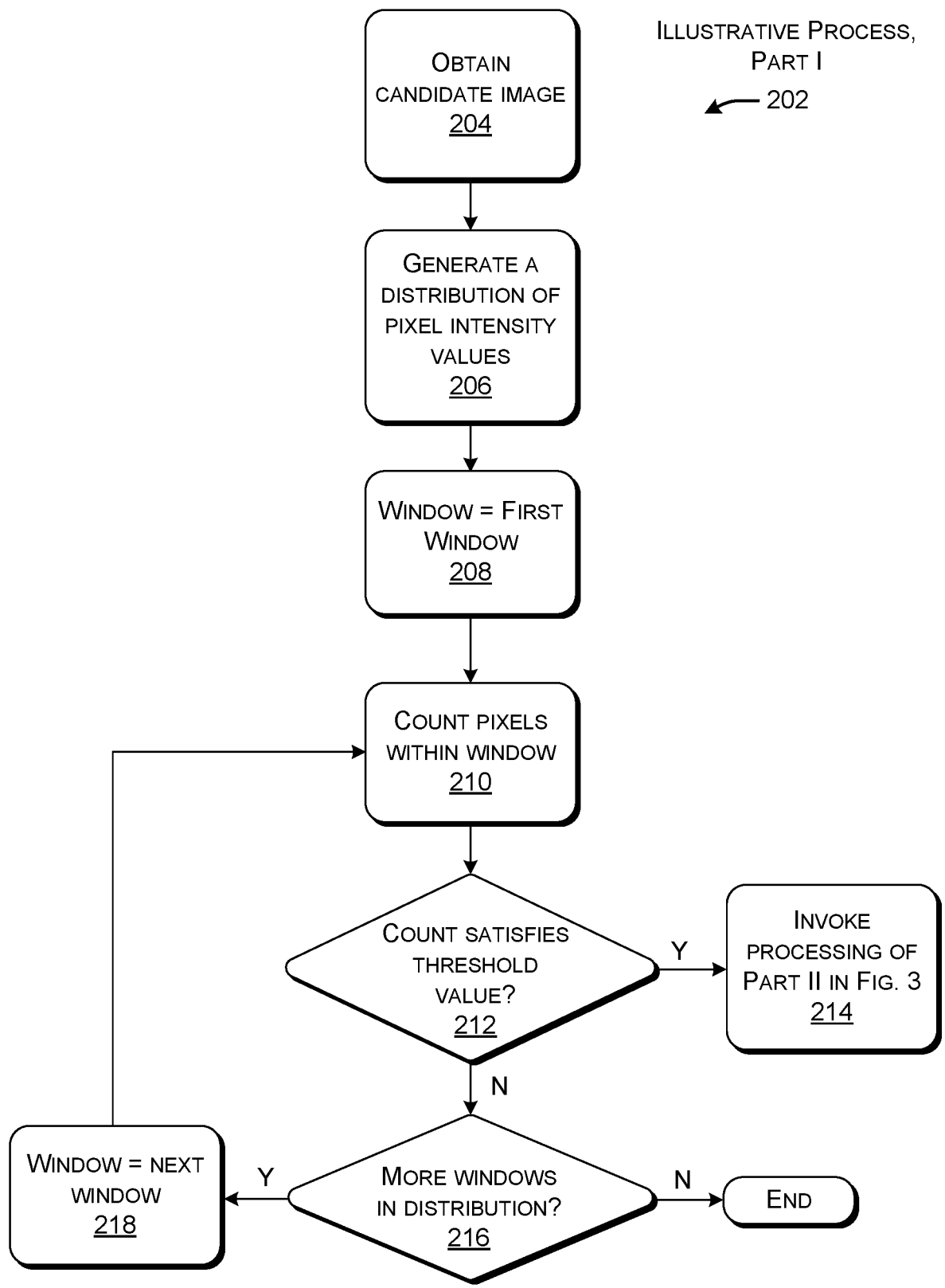
FIG. 2 shows a process that performs a first part of a region-identifying process used by the image-processing system of FIG. 1.

FIG. 2 shows an illustrative process 202 that represents one manner of operation of the window-analyzing module 116. The process 202 corresponds to a first part (Part I) of the two-part process performed by the image-processing system 102. More generally, the process 202 is expressed as a series of operations performed in a particular order. But the order of these operations is merely representative, and the operations are capable of being varied in other implementations. Further, any two or more operations described below can be performed in a parallel manner. In one implementation, the blocks shown in the flowcharts that pertain to processing-related functions are implemented by the hardware logic circuitry described in connection with FIGS. 9 and 10, which, in turn, is implemented by one or more processors, a computer-readable storage medium, etc. Note that the same clarification applies to any of the flowcharts of this application (e.g., in FIGS. 3, 7, and 8).

In block 204, the distribution-generating module 110 receives the candidate image 106. In block 206, the distribution-generating module 110 generates a distribution of intensity values in the candidate image 106, such as the representative distribution 112 shown in FIG. 1. In block 208, the window-analyzing module 110 defines the current window to be analyzed as the first-occurring window. In block 210, the window-analyzing module 110 counts the number of pixels in the current window. In block 212, the window-analyzing module 110 determines whether the count of pixels in the current window, divided by the total number of pixels in the entire candidate image 106, satisfies an environment-specific threshold value. If this inquiry is answered in the affirmative (Y), then the image-processing system 102 advances to block 214, in which the image-processing system 102 invokes the region-analyzing module 120. If this inquiry is answered in the negative (N), then the image-processing system 102 advances to block 216, in which the image-processing system 102 determines whether there are any remaining windows to process. If the inquiry of block 216 is answered in the affirmative (Y), then the window-analyzing module 120 sets the current window to the next window in the distribution, per block 218. The image-processing system 102 then returns to block 210 to repeat the above-described series of operations. If block 216 is answered in the negative (N), then the image-processing system 102 terminates its processing of the candidate image 106.

FIG. 3 shows an illustrative process 302 that represents one manner of operation of the region-analyzing module 120 with respect to the current window under consideration, e.g., the window 118 shown in FIG. 1. The process 302 corresponds to a second part (Part II) of the two-part process performed by the image-processing system 102. In block 304, the region-analyzing module 120 sorts all the pixels in the current window 118 by their position in the candidate image 106, e.g., by sorting the pixels based on their position along the x axis of the candidate image 106, and then sorting all pixels that share the same x value by their position along the y axis. This yields a sorted set of pixels 122. In block 306, the region-analyzing module 120 selects a first qualifying subset of pixels (e.g., the subset of pixels 124) as the current subset of pixels for analysis. The test to determine what constitutes a "qualifying subset of pixels" is set forth in greater detail in the context of the explanation of FIG. 4.

In block 308, the region-analyzing module 120 selects a starting pixel within the qualifying subset of pixels 124, such as the representative starting pixel 126. The region-analyzing module 120 then finds all the neighboring pixels in the candidate image 106 having the intensity values within the current window 118, beginning with the starting pixel 126.

As described above, in some implementations, the region-analyzing module 120 uses a breadth-first search operation to conduct this search. This operation first entails finding all the pixels that are direct neighbors of the starting pixel 126. This defines a first group 310 of neighboring pixels. The region-analyzing module 120 then finds all the pixels that are direct neighbors to any of the pixels in the first group. This defines a second group 312 of neighboring pixels. As illustrated in FIG. 3, assume that, when the search is completed, the region-analyzing module 120 identifies a candidate contiguous region 314 in the candidate image 106.

In block 316, the region-analyzing module 120 determines whether the candidate contiguous region identified in block 308 satisfies a prescribed test. In some implementations, the region-analyzing module 120 specifically applies a two-part test. In a first part, the region-analyzing module 120 determines whether the candidate contiguous region (e.g., candidate contiguous region 314) has a sufficient size. The region-analyzing module 120 can make this determination, in turn, by computing the number of pixels in the candidate contiguous region 314, and dividing this number of pixels by the total number of pixels in the candidate image 106, to produce a ratio. The region-analyzing module 120 then compares this ratio with an environment-specific size threshold value.

In the second test, the region-analyzing module 120 determines whether the contiguous region 314 intersects each edge the candidate image 106 specified by an edge set by a prescribed amount. For example, assume that the edge set specifically identifies edges E1, E2, edge E3, but not edge E4. Further assume that an edge threshold value is 50 percent. For each of these individual edges, the region-analyzing module 120 counts the pixels of the edge that are intersected by the contiguous region 314, and divides this count by a total number of pixels in the edge, to generate a ratio. If each of the ratios for edges E1, E2, and E3 is greater than or equal to 0.50, then the region-analyzing module 120 will conclude that the contiguous region 314 satisfies the second test. Other implementations can vary this test in any manner, e.g., by summing the counts for E1, E2, and E3, and dividing this sum by the sum of the total number of pixels in E1, E2, and E3.

A qualifying contiguous region is a contiguous region that satisfies both the tests described above. The region-analyzing module 120 invokes block 318 when a qualifying contiguous region is found, which involves generating an output value that indicates that a qualifying candidate region is found, a set of values that specify the pixels of the qualifying candidate region. Otherwise, in block 320, the region-analyzing module 120 determines whether there are any more qualifying subsets of pixels in the current window 118 to process. If so, in block 322, the region-analyzing module 120 defines the current subset of pixels as the next qualifying subset of pixels, and advances processing to block 308. If not, in block 324, the region-analyzing module 120 returns a result of false.

A developer can choose the various parameters of the processes (202, 302) of FIGS. 2 and 3 to control different aspects of the behavior of the image-processing system 102. With respect to the first process 202, the developer can increase the window size to expand the range of pixels intensities that are effectively treated as the same. The developer can also vary the threshold value used in block 212 to control the number of times that the second process 302 is invoked.

With respect to the second process 302, the developer can vary a parameter value Straight Line Threshold (SLT), which specifies the required number of pixels in each qualifying subset of pixels. Increasing SLT will reduce the chance that the image-processing system 102 will perform an unproductive search for a qualifying contiguous region. However, by setting SLT too large, the image-processing system 102 can potentially fail to detect some qualifying contiguous regions. The developer can also vary the size threshold value used in block 306 to govern what is considered a contiguous region of sufficient size. However, the size threshold value used in block 306 should not be greater than the threshold value used in block 212.

Similarly, the developer can adjust the edge-related parameters used in block 306 to govern the extent to which a qualifying contiguous region is expected to intersect the edges of the candidate image 106. Indeed, the developer can effectively disable this test by setting the edge threshold value to zero and/or the edge set to empty. With these settings, a qualifying contiguous region may not intersect any of the candidate image's edges. Including the second test, however, is useful to identify a contiguous region that serves as background content for the entire candidate image 106, rather than a large object of constant intensity in the candidate image 106.

In other implementations, the developer uses a machine-trained model that produces an optimal set of parameter values. In one case, such a machine-trained model generates a single global optimal set of parameter values for a general class of candidate images. Here, the developer applies the machine-trained model in a preliminary offline process to generate the single global optimal set, and thereafter use the same global optimal set in the analysis of all candidate images that belong to the general class. In another case, a machine-trained model generates an image-specific set of parameter values for each particular candidate image. Here, in the real-time use stage, the image-processing system 102 uses the machine-trained model to predict an optimal set of parameter values given a particular candidate image. The image-processing system 102 then uses the image-specific set of parameter values for only that particular candidate image.

One kind of training set for developing such a machine-trained model includes a collection of images, accompanied by respective sets of optimal parameter values for those images. In some cases, a human expert manually specifies those optimal sets. A training system (not shown) learns to "translate" a given image to its optimal set of parameter values, e.g., using gradient descent in combination with backpropagation. The machine-trained model itself can use any architecture(s). For instance, the machine-trained model can be implemented as a neural network of any type(s), including any of a fully-connected feed-forward neural network, a convolutional neural network, a recurrent neural network, a transformer-type neural network, etc.

Figure 4:
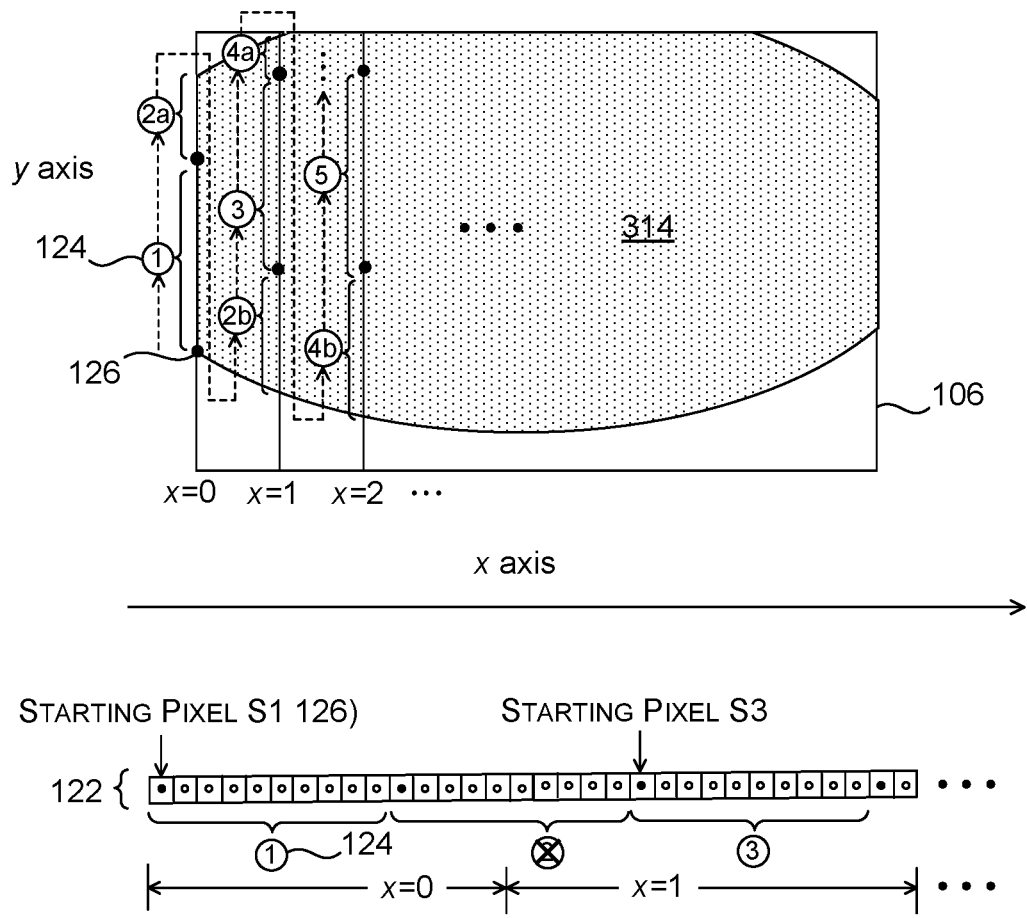
FIG. 4 shows one manner of stepping through an ordered set of pixels at fixed intervals, and, for each iteration, invoking a search upon the occurrence of a triggering condition.

FIG. 4 shows one technique for choosing a succession of qualifying subsets of pixels, each of which has a number of pixels given by SLT. To repeat, in block 304 of FIG. 3, the region-analyzing module 120 first orders the pixels across the candidate image 106 by x, and then orders the pixels that share the same x value by their y values. This yields a sorted set 122 of pixel values. In one illustrative implementation, a qualifying subset of pixels is a subset of pixels for which: a) the total number of pixels is SLT; b) all of the pixels in the subset have the same x value; and c) the pixels are connected without gaps, meaning that the first pixel in the subset is a direct neighbor to the succeeding second pixel in the subset, the second pixel in the subset is a direct neighbor to the succeeding third pixel in the subset, and so on.

FIG. 4 illustrates one manner in which the region-analyzing module 120 applies the above-described test to the first five candidate subsets of pixels that are encountered (some of which are qualifying, and other which are not). Assume that SLT is set to 10 pixels. The region-analyzing module 120 determines that the first 10 pixels in the sorted set 122 share the same x value (that is, x=0) and do not have any gaps in connection. The region-analyzing module 120 will therefore designate the first 10 pixels as a qualifying subset of pixels. The region-analyzing module 120 will conclude that the second set of 10 pixels is not a qualifying set of pixels because some of the pixels have the value of x=0 and others have the value of x=1. Further, there is a gap between the top-most pixel in the scan line for x=0 and the bottom-most pixel in the scan line for x=1. Using similar analysis, the region-analyzing module 120 will conclude that the third subset of 10 pixels is qualifying, the fourth subset of 10 pixels is non-qualifying, and the fifth subset of 10 pixels is qualifying.

Upon encountering a qualifying subset of pixels, the region-analyzing module 120 commences a search beginning from a starting pixel (per block 308 of FIG. 3). In some implementations, the region-analyzing module 120 specifically chooses the first-occurring pixel in the qualifying subset of pixels. Note that a search commenced from the starting pixel 126 of the first subset of pixels 124 will lead to the discovery of all of the pixels in the contiguous region 314; thus, the search is not confined to the first subset of pixels 124 itself.

In some implementations, the region-analyzing module 120 can terminate its search upon discovering a single qualifying contiguous region. In other implementations, the region analyzing module 120 continues its search based on the prospect that the candidate image 106 may contain two or more separated regions, each of which constitute a qualifying contiguous region. The various parameter values of the image-processing system 102 are adjustable to ensure that a qualifying contiguous region in the candidate image 106 is discovered, if such a region exists.

Other implementations can vary the above-described sampling behavior in different ways. For example, another implementation randomly chooses different starting pixels within the sorted set 122 of pixels. Another implementation performs a search for each subset of SLT pixels, regardless of whether this subset meets the test described above. It is useful to perform the test, however, to reduce the number of unproductive searches, and therefore shorten latency and reduce the consumption of resources. Another implementation first sorts pixels along the y axis, and then x axis. Here, the image-processing system 102 examines pixel subsets along lines with constant y value.

Figure 5:
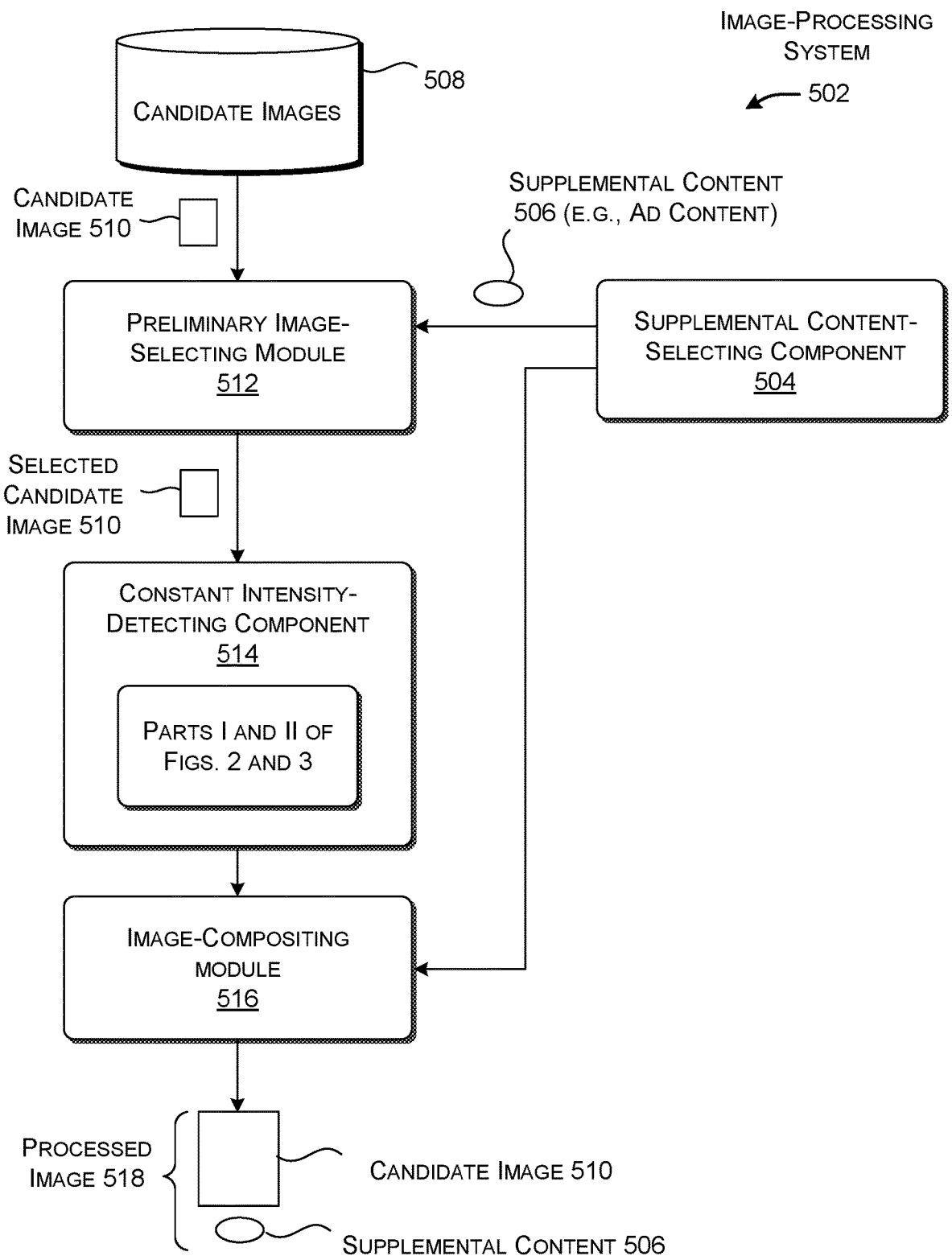
FIG. 5 shows one application of the image-processing system of FIG. 1.

FIG. 5 represents an image-processing system 502 which corresponds to one illustrative application of the image-processing system 102 of FIG. 1. In one illustrative context, assume that the image-processing system 502 uses supplemental content-selecting component 504 to choose supplemental content 506. The remainder of the image-processing system 502 then selects a candidate image that is suitable for combining with the supplemental content 506. In one specific application, the supplemental content corresponds to ad-related content expressed as text content and/or image content and/or some other type of content (including video content, audio content, etc.). The supplemental content 506 may also include information that renders the supplemental content 506 operable when presented on a user interface presentation. For example, the supplemental content 506 can include a link to a landing page related to a product or service being advertised.

More specifically, in some environments, the advertiser will specifically wish to avoid candidate images having large contiguous regions of constant pixel intensity. This is because, the advertiser may have empirically concluded that such a candidate image will impede engagement with the ad content, relative to a more varying and dynamic background image. In other environments, an advertiser may wish to apply ad content to candidate images having large contiguous regions of constant intensity.

In some cases, an advertiser will explicitly propose a candidate image for consideration, and the image-processing system 502 seeks to verify whether the candidate image is suitable for combination with the supplemental content 506. In other cases, the image-processing system 502 will independently choose a suitable candidate image from a data store 508 of candidate background images.

The image-processing system 502 is explained below in the context of processing performed on a candidate image 510, in whatever manner obtained. The above-described advertising context is representative; other applications are possible. For instance, a social network application may wish to find background images having large contiguous regions of intensity to combine with biographical information regarding a person (which constitutes foreground content).

The supplemental content-selecting component 504 can apply any process to determine the supplemental content 506. In an advertising application, in some implementations, the supplemental content-selecting component 504 receives ad content explicitly specified by an advertiser. The supplemental content-selecting component 504 then optionally validates the supplemental content 506 according to any application-specific logic. Alternatively, or in addition, the supplemental content-selecting component 504 automatically creates the supplemental content 506 based on input information provided by the advertiser. For example, the supplemental content-selecting component 504 uses application-specific logic to scrape the content of a website identified by the advertiser, and then automatically creates ad content which complements the content of the website. One service for automatically creating ad content is the dynamic search ad service provided by MICROSOFT CORPORATION of Redmond, Washington.

A preliminary image-processing module 512 performs preliminary processing on the candidate image 510. In some implementations, this entails determining whether the candidate image 510 contains objectionable content (e.g., adult content and/or copyrighted content). In some implementations, the preliminary image-processing system 512 performs this operation by consulting one or more lookup dictionaries that identify prohibited content.

In addition, or alternatively, the preliminary image-processing module 512 determines whether the supplemental content 506 and the candidate image 510 contain semantically compatible content. Examples of machine-trained models for comparing items are described in the following commonly-assigned U.S. patents documents: Published Application No. 2015/0074027 to Huang, et al., published on Mar. 12, 2015; and U.S. Pat. No. 11,461,415 to Lu, et al., published on Oct. 4, 2022. In addition, or alternatively, the preliminary image-processing module 512 uses handcrafted rules to determine whether the supplemental content 506 is compatible with the candidate image 510. One such rule uses a lookup dictionary to determine whether any words that appear in the supplemental content 506 are considered compatible with any words that may appear in the candidate image 510.

Assume that the candidate image 510 passes the test(s) applied by the preliminary image-processing module 512. If so, a constant intensity-detecting component 514 performs further processing on the candidate image 510. The constant intensity-detecting component 514 specifically performs the processes (202, 302) of FIGS. 2 and 3 to determine whether the candidate image 510 contains a qualifying contiguous region of constant intensity. As previously stated, a qualifying region is a region that satisfies all the tests described above.

An image-compositing component 516 generates a processed image 518 based on the results of the constant intensity-detecting component 514. The processed image 518 includes a combination of the supplemental content 506 and the candidate image 510, e.g., by applying the supplemental content 506 next to or on top of the candidate image 510. In other cases, the supplemental content 506 is a hyper link that is added to the candidate image 510; the link performs an action when activated, but is not necessarily accompanied by information having a visual manifestation to an end user. In some implementations, the image-compositing component 516 combines the supplemental content 506 with the candidate image 510 if the candidate image 510 is determined to lack a qualifying contiguous region of constant pixel values. In other implementations, the image-compositing component 516 performs this combination if the candidate image 510 is determined to contain a qualifying contiguous region of constant pixels values.

Figure 6:
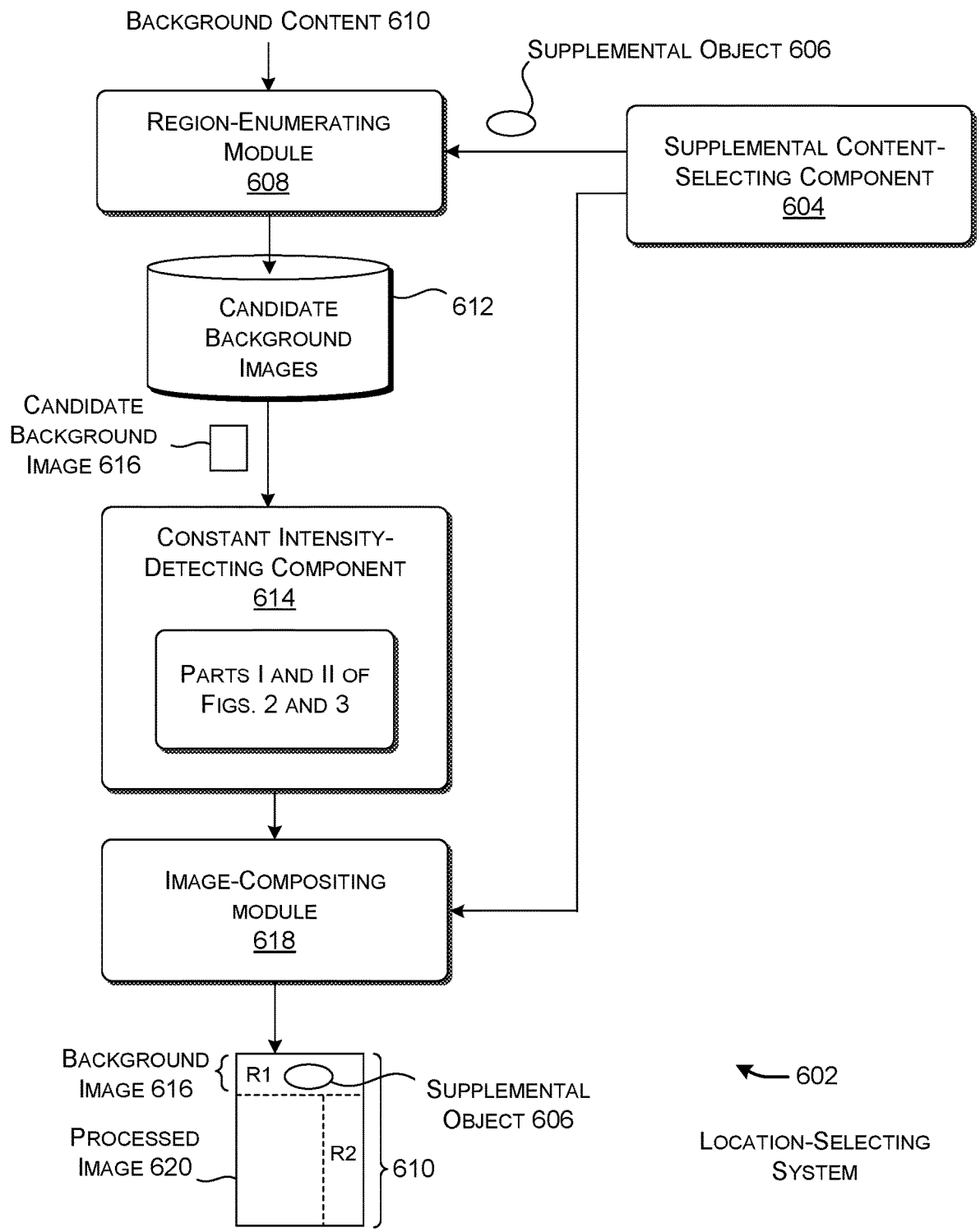
FIG. 6 shows another application of the image-processing system of FIG. 1.

FIG. 6 shows a location-selecting system 602 that incorporates the processes (202, 302) described in FIGS. 2 and 3. The goal of the location-selecting system 602 is as before: to combine selected supplemental content with a suitable candidate image. Here, the supplemental content corresponds to an object of any type that an application seeks to present on background content. Different candidate background images correspond to different regions of the background content. In this context, the goal of the location-selecting system 602 is to choose the most appropriate location, corresponding to a particular background image, to place the supplemental object.

In some implementations, an online service implements the location-selecting system 602. For example, assume that a user is currently interacting with a page of a particular website. The content of the page constitutes background content and different regions of that page constitute different candidate background images. In this context, the location-selecting system 602 uses the processes (202, 302) of FIGS. 2 and 3 to determine the region of the page that is most suitable to place the supplemental object.

In other implementations, a local graphical user interface (GUI) system implements the location-selecting system 602. Here, assume that logic of any type (such as an application) seeks to present supplemental content on a user interface presentation. The content of the user interface presentation constitutes background content and different regions of that user interface presentation constitute different candidate background images. In this context, the location selecting system 602 uses the processes (202, 302) of FIGS. 2 and 3 to determine the region of the user interface presentation that is most suitable to place the supplemental object. Still other applications of the location-processing system 602 are possible.

More specifically, a supplemental content-selecting component 604 selects a supplemental object 606 to place on background content. In some contexts, the supplemental-selecting component 604 is an application or other logic that generates the supplemental object 606, or that receives from the supplemental object 606 from another source.

A region-enumerating module 608 identifies different regions of background content 610, which constitutes different candidate background images. Different implementations perform this operation in different respect ways. In some implementations, the region-enumerating module 608 identifies all the valid locations at which the supplemental object 606 can be placed. For example, a page may have peripheral regions allocated to the presentation of ads, including a top banner, side regions, inter-content regions, etc. Each such region constitutes a valid background image. In some implementations, the region-enumerating module 608 stores the viable background images in a data store 612, or stores indexing information that refers to the viable background images.

A constant intensity-detecting component 614 chooses a candidate background image 616, corresponding to a candidate location, and performs further processing on the candidate background image 616. The constant intensity-detecting component 614 specifically performs the processes (202, 302) of FIGS. 2 and 3 to determine whether the candidate background image 616 contains a qualifying region of contiguous constant intensity. A qualifying region is a region that satisfies all the tests described above.

An image-compositing component 618 generates a processed image 620 based on the results of the constant intensity-detecting component 614. The processed image 620 includes a combination of the supplemental object 606 and the background image 616. Assume that the background image 616, in turn, corresponds to a particular part of the background content 610 (e.g., which may correspond to a website page or a locally-generated GUI presentation). In some implementations, the image-compositing component 618 performs this combination if the background image 616 is determined to lack a qualifying contiguous region of constant pixel values. In other implementations, the image-compositing component 618 performs this combination if the background image is determined to contain a qualifying contiguous region of constant pixels values.

Figure 7:
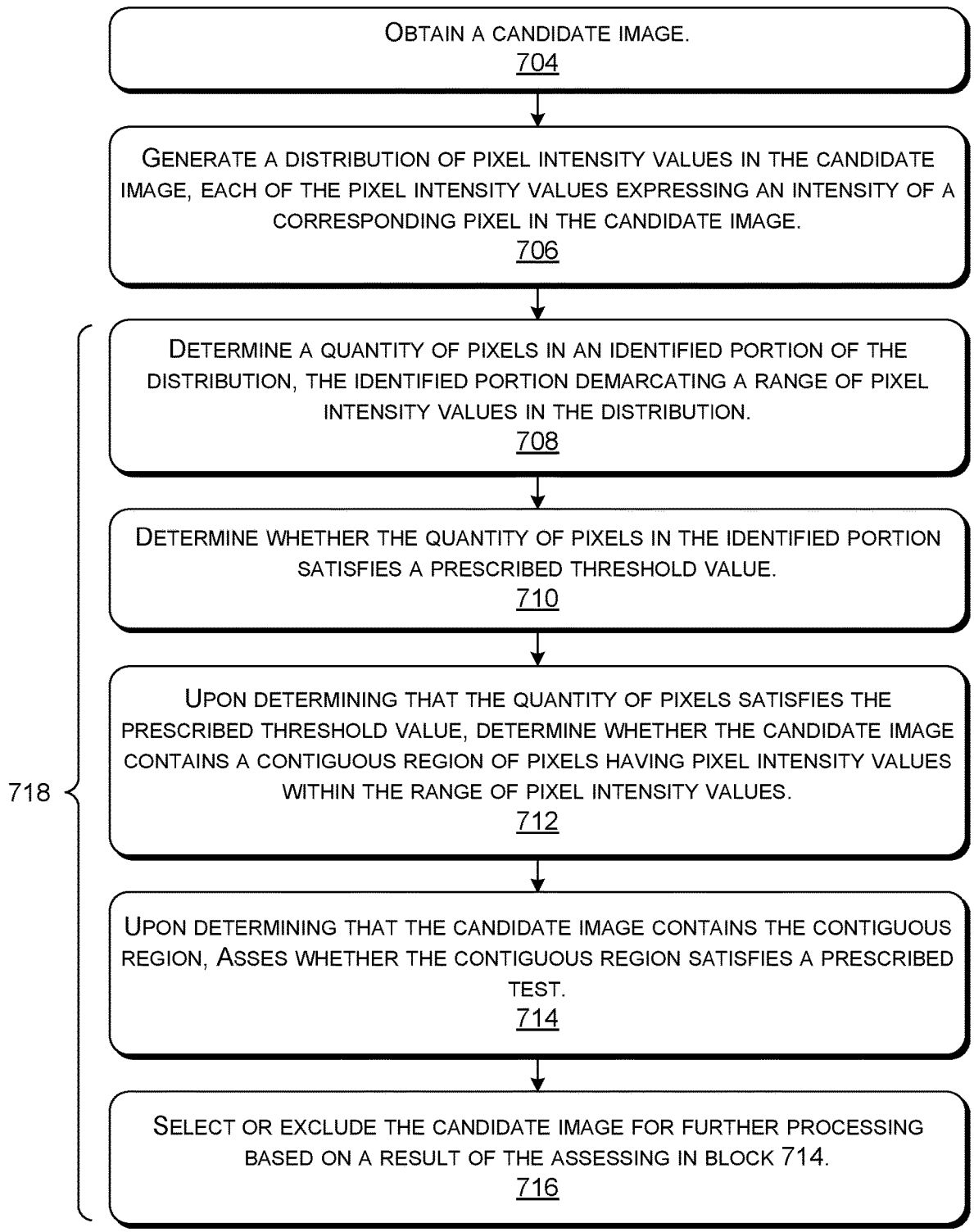
FIG. 7 shows a process that represents an overview of the operation of the image-processing system of FIG. 1.

FIG. 7 shows a process 702 that represents an overview of the operation of the image-processing system 102 of FIG. 1. In block 704, the image-processing system 102 obtains a candidate image (e.g., the candidate image 106). In block 706, the image processing system 102 generates a distribution (e.g., distribution 112) of pixel intensity values in the candidate image, each of the pixel intensity values expressing an intensity of a corresponding pixel in the candidate image. In block 708, the image-processing system 102 determine a quantity of pixels in an identified portion of the distribution (e.g., the window 118), the identified portion demarcating a range of pixel intensity values in the distribution. In block 710, the image-processing system 102 determines whether the quantity of pixels in the identified portion satisfies a prescribed threshold value. In block 712, upon determining that the quantity of pixels satisfies the prescribed threshold value, the image-processing system 102 determines whether the candidate image contains a contiguous region of pixels having pixel intensity values within the range of pixel intensity values. In block 714, the image-processing system 102 assesses whether the contiguous region satisfies a prescribed test. In block 716, the image-processing system 102 selects or excludes the candidate image for further processing based on a result of the assessing. Blocks 708-716 define a portion analysis process 718, which may be performed plural times with respect to different portions of the distribution.

Figure 8:
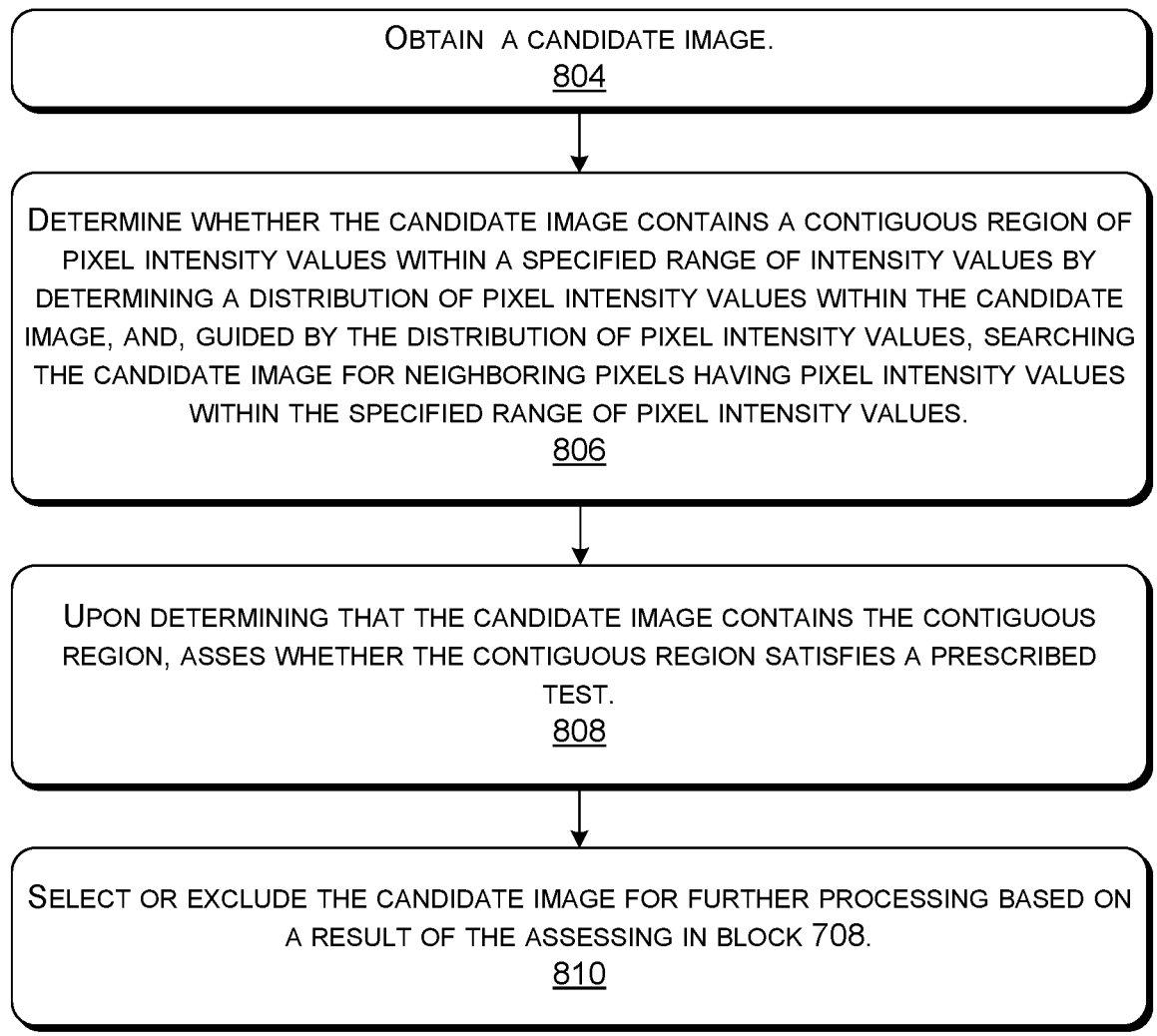
FIG. 8 shows a process that represents another overview of the operation of the image-processing system of FIG. 1.

FIG. 8 shows another process 802 that represents an overview of the operation of the image-processing system 102 of FIG. 1. In block 804, the image-processing system 102 obtains a candidate image (e.g., the candidate image 106). In block 806, the image-processing system 102 determines whether the candidate image contains a contiguous region of pixel intensity values within a specified range of intensity values (e.g., the window 118). Block 806 involves determining a distribution of pixel intensity values (e.g., the distribution 112) within the candidate image, and, guided by the distribution of pixel intensity values, searching the candidate image for neighboring pixels having pixel intensity values within the specified range of pixel intensity values. In block 808, upon determining that the candidate image contains the contiguous region, the image-processing system 102 assesses whether the contiguous region satisfies a prescribed test. In block 810, the image-processing system 102 selects or excludes the candidate image for further processing based on a result of the assessing.

Figure 9:
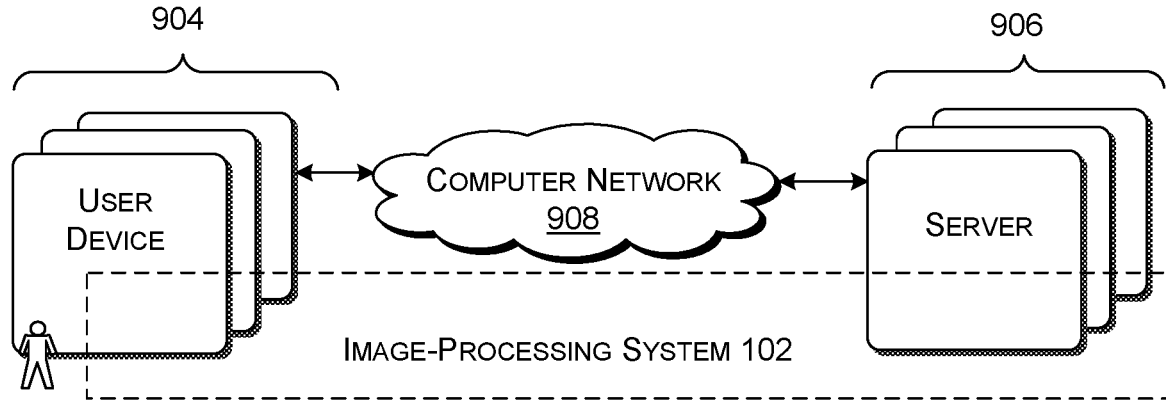
FIG. 9 shows computing equipment that, in some implementations, is used to implement the image-processing system of FIG. 1.

FIG. 9 shows computing equipment 902 that, in some implementations, is used to implement the image-processing system 102 of FIG. 1. The computing equipment 902 includes a set of user devices 904 coupled to a set of servers 906 via a computer network 908. Each user device corresponds to any type of computing device, including any of a desktop computing device, a laptop computing device, a handheld computing device of any type (e.g., a smartphone or a tablet-type computing device), a mixed reality device, a wearable computing device, an Internet-of-Things (IoT) device, a gaming system, a media device, a vehicle-borne computing system, any type of robot computing system, a computing system in a manufacturing system, etc. In some implementations, the computer network 908 is implemented as a local area network, a wide area network (e.g., the Internet), one or more point-to-point links, or any combination thereof.

The dashed-line box in FIG. 9 indicates that the functionality of the image-processing system 102 is capable of being spread across the user devices 904 and/or the servers 906 in any manner. For instance, in some cases, one or more of the servers 906 implement the entirety of the image-processing system 102. Here, each user device interacts with the image-processing system 102 using a browser application, for instance. More specifically, assume that a user submits a search via a search interface available through a browser application, or performs some other triggering action using the browser application, such as opening an email message. In response, the image-processing system 102 generates a processed image, and then serves the processed image to the user's browser application. For example, in the advertising context, the processed image contains ad content which is placed next to or on top of an image. In this context, the image-processing system 102 verifies that the image does not include any qualifying contiguous regions of constant intensity values (or includes such a region, depending on the objective of the advertiser). In other cases, at least some aspects of the functionality of the image-processing system 102 are locally implemented by each user computing device.

Figure 10:
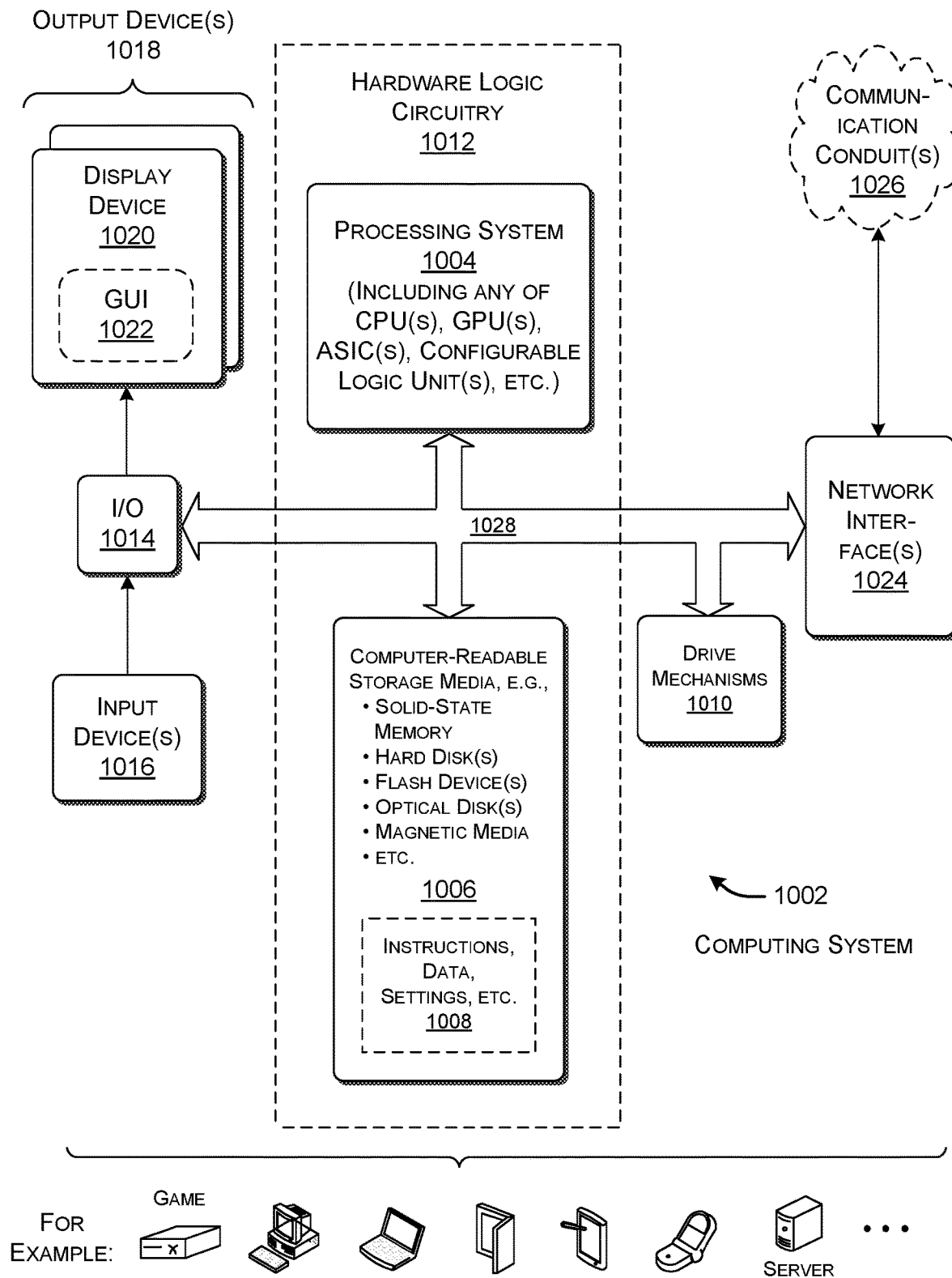
FIG. 10 shows an illustrative type of computing system that, in some implementations, is used to implement any aspect of the features shown in the foregoing drawings.

FIG. 10 shows a computing system 1002 that, in some implementations, is used to implement any aspect of the mechanisms set forth in the above-described figures. For instance, in some implementations, the type of computing system 1002 shown in FIG. 10 is used to implement any user computing device or any server shown in FIG. 9. In all cases, the computing system 1002 represents a physical and tangible processing mechanism.

The computing system 1002 includes a processing system 1004 including one or more processors. The processor(s) include one or more Central Processing Units (CPUs), and/or one or more Graphics Processing Units (GPUs), and/or one or more Application Specific Integrated Circuits (ASICs), and/or one or more Neural Processing Units (NPUs), etc. More generally, any processor corresponds to a general-purpose processing unit or an application-specific processor unit.

The computing system 1002 also includes computer-readable storage media 1006, corresponding to one or more computer-readable media hardware units. The computer-readable storage media 1006 retains any kind of information 1008, such as machine-readable instructions, settings, and/or data. For example, in some implementations, the computer-readable storage media 1006 includes one or more solid-state devices, one or more magnetic hard disks, one or more optical disks, magnetic tape, etc. Any instance of the computer-readable storage media 1006 uses any technology for storing and retrieving information. Further, any instance of the computer-readable storage media 1006 represents a fixed or removable unit of the computing system 1002. Further, any instance of the computer-readable storage media 1006 provides volatile and/or non-volatile retention of information.

More generally, any of the storage resources described herein, or any combination of the storage resources, is to be regarded as a computer-readable medium. In many cases, a computer-readable medium represents some form of physical and tangible entity. The term computer-readable medium also encompasses propagated signals, e.g., transmitted or received via a physical conduit and/or air or other wireless medium. However, the specific term "computer-readable storage medium" or "storage device" expressly excludes propagated signals per se in transit, while including all other forms of computer-readable media.

The computing system 1002 utilizes any instance of the computer-readable storage media 1006 in different ways. For example, in some implementations, any instance of the computer-readable storage media 1006 represents a hardware memory unit (such as Random Access Memory (RAM)) for storing information during execution of a program by the computing system 1002, and/or a hardware storage unit (such as a hard disk) for retaining/archiving information on a more permanent basis. In the latter case, the computing system 1002 also includes one or more drive mechanisms 1010 (such as a hard drive mechanism) for storing and retrieving information from an instance of the computer-readable storage media 1006.

In some implementations, the computing system 1002 performs any of the functions described above when the processing system 1004 executes computer-readable instructions stored in any instance of the computer-readable storage media 1006. For instance, in some implementations, the computing system 1002 carries out computer-readable instructions to perform each block of the processes of FIGS. 2, 3, 7, and 8. FIG. 10 generally indicates that hardware logic circuitry 1012 includes any combination of the processing system 1004 and the computer-readable storage media 1006.

In addition, or alternatively, the processing system 1004 includes one or more other configurable logic units that perform operations using a collection of logic gates. For instance, in some implementations, the processing system 1004 includes a fixed configuration of hardware logic gates, e.g., that are created and set at the time of manufacture, and thereafter unalterable. In addition, or alternatively, the processing system 1004 includes a collection of programmable hardware logic gates that are set to perform different application-specific tasks. The latter category of devices includes Programmable Array Logic Devices (PALs), Generic Array Logic Devices (GALs), Complex Programmable Logic Devices (CPLDs), Field-Programmable Gate Arrays (FPGAs), etc. In these implementations, the processing system 1004 effectively incorporates a storage device that stores computer-readable instructions, insofar as the configurable logic units are configured to execute the instructions and therefore embody or store these instructions.

In some cases (e.g., in the case in which the computing system 1002 represents a user computing device), the computing system 1002 also includes an input/output interface 1014 for receiving various inputs (via input devices 1016), and for providing various outputs (via output devices 1018). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers and/or gyroscopes), etc. In some implementations, one particular output mechanism includes a display device 1020 and an associated graphical user interface presentation (GUI) 1022. The display device 1020 corresponds to a liquid crystal display device, a light-emitting diode display (LED) device, a cathode ray tube device, a projection mechanism, etc. Other output devices include a printer, one or more speakers, a haptic output mechanism, an archival mechanism (for storing output information), etc. In some implementations, the computing system 1002 also includes one or more network interfaces 1024 for exchanging data with other devices via one or more communication conduits 1026. One or more communication buses 1028 communicatively couple the above-described units together.

The communication conduit(s) 1026 is capable of being implemented in any manner, e.g., by a local area computer network, a wide area computer network (e.g., the Internet), point-to-point connections, or any combination thereof. The communication conduit(s) 1026 include any combination of hardwired links, wireless links, routers, gateway functionality, name servers, etc., governed by any protocol or combination of protocols.

FIG. 10 shows the computing system 1002 as being composed of a discrete collection of separate units. In some cases, the collection of units corresponds to discrete hardware units provided in a computing device chassis having any form factor. FIG. 10 shows illustrative form factors in its bottom portion. In other cases, the computing system 1002 includes a hardware logic unit that integrates the functions of two or more of the units shown in FIG. 1. For instance, in some implementations, the computing system 1002 includes a system on a chip (SoC or SOC), corresponding to an integrated circuit that combines the functions of two or more of the units shown in FIG. 10.

The following summary provides a set of illustrative examples of the technology set forth herein.

(A1) According to a first aspect, a computer-implemented method (e.g., 702) is described for processing images. The method includes: obtaining (e.g., in block 704) a candidate image (e.g., 106); and generating (e.g., in block 706) a distribution of pixel intensity values (e.g., 112) in the candidate image, each of the pixel intensity values expressing an intensity of a corresponding pixel in the candidate image. In a portion analysis process (e.g., process 718), the method includes: determining (e.g., in block 708) a quantity of pixels in an identified portion of the distribution, the identified portion demarcating a range of pixel intensity values in the distribution; determining (e.g., in block 710) whether the quantity of pixels in the identified portion satisfies a prescribed threshold value; upon determining that the quantity of pixels satisfies the prescribed threshold value, determining (e.g., in block 712) whether the candidate image contains a contiguous region of pixels having pixel intensity values within the range of pixel intensity values; upon determining that the candidate image contains the contiguous region, assessing (e.g., in in block 714) whether the contiguous region satisfies a prescribed test; and selecting or excluding (e.g., in block 716) the candidate image for further processing based on a result of the assessing.

(A2) According to some implementations of the method of A1, the distribution is expressed as a histogram that specifies counts of pixels for respective subranges of pixel intensity values, and the identified portion encompasses one or more subranges.

(A3) According to some implementations of the method of A1 or A2, the method involves performing the portion analysis process for at least one other portion and associated range of the distribution.

(A4) According to some implementations of any individual method of A1-A3, the determining whether the quantity of pixels in the identified portion satisfies a prescribed threshold value involves determining whether the quantity of pixels relative to a total quantity of pixels in the candidate image satisfies the prescribed threshold value.

(A5) According to some implementations of any individual method of A1-A4, the determining whether the candidate image contains a contiguous region of pixel intensity values involves performing a search for neighboring pixels in the candidate image with pixel intensity values within the range of pixel intensity values, starting from a selected starting pixel.

(A6) According to some implementations of the method of A5, the search is a breadth-first search.

(A7) According to some implementations of any individual method of A1-A6, the method further includes sorting pixels in the identified portion with respect to location of the pixels in the identified portion across the candidate image, with respect to at least one axis of the candidate image, to produce a sorted set of pixels.

(A8) According to some implementations of the method of A7, the determining whether the candidate image contains a contiguous region of pixel intensity values is performed for a specified subset of pixels in the sorted set of pixels.

(A9) According to some implementations of the method of 8, a search for pixels having pixel intensity values within the range of pixel intensity values is commenced from a starting pixel in the subset of pixels upon determining that the pixels in the subset of pixels are spatially-connected pixels and share a same position on one axis of the candidate image.

(A10) According to some implementations of any individual method of A1-9, the test involves determining whether a quantity of pixels in the contiguous region satisfies another prescribed threshold value, with respect to a total quantity of pixels in the candidate image.

(A11) According to some implementations of the method of A10, the test also involves determining whether the contiguous region intersects at least one edge of the candidate image by a prescribed amount.

(A12) According to some implementations of any individual method of A1-A11, the further processing involves combining the candidate image with supplemental content.

(A13) According to some implementations of the method of A12, the method further includes serving the candidate image and the supplemental content as an advertisement.

(A14) According to some implementations of any individual method of A1-A13, the method further includes generating a first value that indicates whether the candidate image contains the contiguous region, and a second set of values that identify the pixels in the contiguous region.

(B1) According to a second aspect, another computer-implemented method (e.g., 802) is described for processing images. The method includes: obtaining (e.g., in block 804) a candidate image (e.g., 106); determining (e.g., in block 806) whether the candidate image contains a contiguous region of pixel intensity values within a specified range of intensity values, the determining involving determining a distribution of pixel intensity values (e.g., 112) within the candidate image, and, guided by the distribution of pixel intensity values, searching the candidate image for neighboring pixels having pixel intensity values within the specified range of pixel intensity values; upon determining that the candidate image contains the contiguous region, assessing (e.g., in block 808) whether the contiguous region satisfies a prescribed test; and selecting or excluding (e.g., in block 810) the candidate image for further processing based on a result of the assessing.

In yet another aspect, some implementations of the technology described herein include a computing system (e.g., the computing system 1002) that includes a processing system (e.g., the processing system 1004) having a processor. The computing system also includes a storage device (e.g., the computer-readable storage media 1006) for storing computer-readable instructions (e.g., information 1008). The processing system executes the computer-readable instructions to perform any of the methods described herein (e.g., any individual method of the methods of A1-A14 or B1).

In yet another aspect, some implementations of the technology described herein include a computer-readable storage medium (e.g., the computer-readable storage media 1006) for storing computer-readable instructions (e.g., the information 1008). A processing system (e.g., the processing system 1004) executes the computer-readable instructions to perform any of the operations described herein (e.g., the operation in any individual method of the methods of A1-A14 or B1).

More generally stated, any of the individual elements and steps described herein are combinable into any logically consistent permutation or subset. Further, any such combination is capable of being be manifested as a method, device, system, computer-readable storage medium, data structure, article of manufacture, graphical user interface presentation, etc. The technology is also expressible as a series of means-plus-format elements in the claims, although this format should not be considered to be invoked unless the phrase "means for" is explicitly used in the claims.

As to terminology used in this description, the phrase "configured to" encompasses various physical and tangible mechanisms for performing an identified operation. The mechanisms are configurable to perform an operation using the hardware logic circuitry 1012 of Section C. The term "logic" likewise encompasses various physical and tangible mechanisms for performing a task. For instance, each processing-related operation illustrated in the flowcharts of FIGS. 7 and 8 corresponds to a logic component for performing that operation.

This description may have identified one or more features as "optional." This type of statement is not to be interpreted as an exhaustive indication of features that are to be considered optional; generally, any feature is to be considered as optional, although not explicitly identified in the text, unless otherwise noted. Further, any mention of a single entity is not intended to preclude the use of plural such entities; similarly, a description of plural entities in the specification is not intended to preclude the use of a single entity. As such, a statement that an apparatus or method has a feature X does not preclude the possibility that it has additional features. Further, any features described as alternative ways of carrying out identified functions or implementing identified mechanisms are also combinable together in any combination, unless otherwise noted.

Further, the term "plurality" or "plural" or the plural form of any term (without explicit use of "plurality" or "plural") refers to two or more items, and does not necessarily imply "all" items of a particular kind, unless otherwise explicitly specified. The term "at least one of" refers to one or more items; reference to a single item, without explicit recitation of "at least one of" or the like, is not intended to preclude the inclusion of plural items, unless otherwise noted. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. A "set" includes zero members, one member, or more than one member. Finally, the terms "exemplary" or "illustrative" refer to one implementation among potentially many implementations.

In closing, the functionality described herein is capable of employing various mechanisms to ensure that any user data is handled in a manner that conforms to applicable laws, social norms, and the expectations and preferences of individual users. For example, the functionality is configurable to allow a user to expressly opt in to (and then expressly opt out of) the provisions of the functionality. The functionality is also configurable to provide suitable security mechanisms to ensure the privacy of the user data (such as data-sanitizing mechanisms, encryption mechanisms, and/or password-protection mechanisms).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for processing images, comprising:
   obtaining a candidate image;
   generating a distribution of pixel intensity values in the candidate image, each of the pixel intensity values expressing an intensity of a corresponding pixel in the candidate image;
   in a portion analysis process,
   determining a quantity of pixels in an identified portion of the distribution, the identified portion demarcating a range of pixel intensity values in the distribution;
   determining whether the quantity of pixels in the identified portion satisfies a prescribed threshold value;
   upon determining that the quantity of pixels satisfies the prescribed threshold value, determining whether the candidate image contains a contiguous region of pixels having pixel intensity values within the range of pixel intensity values;
   upon determining that the candidate image contains the contiguous region, assessing whether the contiguous region satisfies a prescribed test, wherein the test includes determining whether the contiguous region intersects at least one edge of the candidate image by a prescribed amount; and
   selecting or excluding the candidate image for further processing based on a result of the assessing.

2. The computer-implemented method of claim 1, wherein the distribution is expressed as a histogram that specifies counts of pixels for respective subranges of pixel intensity values, and wherein the identified portion encompasses one or more subranges.

3. The computer-implemented method of claim 1, wherein the method involves performing the portion analysis process for at least one other portion and associated range of the distribution.

4. The computer-implemented method of claim 1, wherein the determining whether the quantity of pixels in the identified portion satisfies a prescribed threshold value involves determining whether the quantity of pixels relative to a total quantity of pixels in the candidate image satisfies the prescribed threshold value.

5. The computer-implemented method of claim 1, wherein the determining whether the candidate image contains a contiguous region of pixel intensity values involves performing a search for neighboring pixels in the candidate image with pixel intensity values within the range of pixel intensity values, starting from a selected starting pixel.

6. The computer-implemented method of claim 5, wherein the search is a breadth-first search.

7. The computer-implemented method of claim 1, further including sorting pixels in the identified portion with respect to location of the pixels in the identified portion across the candidate image, with respect to at least one axis of the candidate image, to produce a sorted set of pixels.

8. The computer-implemented method of claim 7, wherein the determining whether the candidate image contains a contiguous region of pixel intensity values is performed for a specified subset of pixels in the sorted set of pixels.

9. The computer-implemented method of claim 8, wherein a search for pixels having pixel intensity values within the range of pixel intensity values is commenced from a starting pixel in the subset of pixels upon determining that the pixels in the subset of pixels are spatially-connected pixels and share a same position on one axis of the candidate image.

10. The computer-implemented method of claim 1, wherein the test involves also includes determining whether a quantity of pixels in the contiguous region satisfies another prescribed threshold value, with respect to a total quantity of pixels in the candidate image.

11. The computer-implemented method of claim 1, wherein the further processing involves combining the candidate image with supplemental content.

12. The computer-implemented method of claim 11, further including serving the candidate image and the supplemental content as an advertisement.

13. The computer-implemented method of claim 1, further including generating a first value that indicates whether the candidate image contains the contiguous region, and a second set of values that identify the pixels in the contiguous region.

14. A computing system, comprising:
   a processing system including a processor; and
   a storage device for storing machine-readable instructions,
   the processing system executing the machine-readable instructions in the storage device to perform operations comprising:
   obtaining a candidate image;
   determining whether the candidate image contains a contiguous region of pixel intensity values within a specified range of intensity values,
   the determining involving determining a distribution of pixel intensity values within the candidate image, and, guided by the distribution of pixel intensity values, searching the candidate image for neighboring pixels having pixel intensity values within the specified range of pixel intensity values;
   upon determining that the candidate image contains the contiguous region, assessing whether the contiguous region satisfies a prescribed test, wherein the test also involves determining whether the contiguous region intersects with at least one edge of the candidate image by a prescribed amount; and
   selecting or excluding the candidate image for further processing based on a result of the assessing.

15. The computing system of claim 14, wherein the test involves also includes determining whether a quantity of pixels in the contiguous region satisfies a prescribed threshold value, with respect to a total quantity of pixels in the candidate image.

16. The computing system of claim 14, wherein the operations further include generating a first value that indicates whether the candidate image contains the contiguous region, and a second set of values that identify the pixels in the contiguous region.

17. A computer-readable storage medium for storing computer-readable instructions, wherein a processing system executes the computer-readable instructions to perform operations comprising:
   obtaining a candidate image;
   generating a distribution of pixel intensity values in the candidate image, each of the pixel intensity values expressing a pixel intensity of a corresponding pixel in the candidate image;
   determining a quantity of pixels in an identified portion of the distribution, the identified portion demarcating a range of pixel intensity values in the distribution;
   sorting pixels in the identified portion with respect to location of the pixels in the identified portion across the candidate image, with respect to at least one axis of the candidate image, to produce a sorted set of pixels;

determining whether the candidate image contains a contiguous region of pixel intensity values having intensity values within the range of intensity values, wherein the determining whether the candidate image contains a contiguous region of pixel intensity values is performed for a specified subset of pixels in the sorted set of pixels, and wherein a search for pixels having pixel intensity values within the range of pixel intensity values is commenced from a starting pixel in the subset of pixels upon determining that the pixels in the subset of pixels are spatially-connected pixels and share a same position on one axis of the candidate image; and upon determining that the candidate image contains the contiguous region, assessing whether the contiguous region satisfies a prescribed test.

18. The computer-implemented method of claim 1, further comprising repeating the portion analysis process for another identified portion of the distribution.

\* \* \* \* \*